June 9, 1964 H. W. SPEAR 3,136,107
LAWN MOWER SHARPENER
Filed Oct. 5, 1962 2 Sheets-Sheet 1
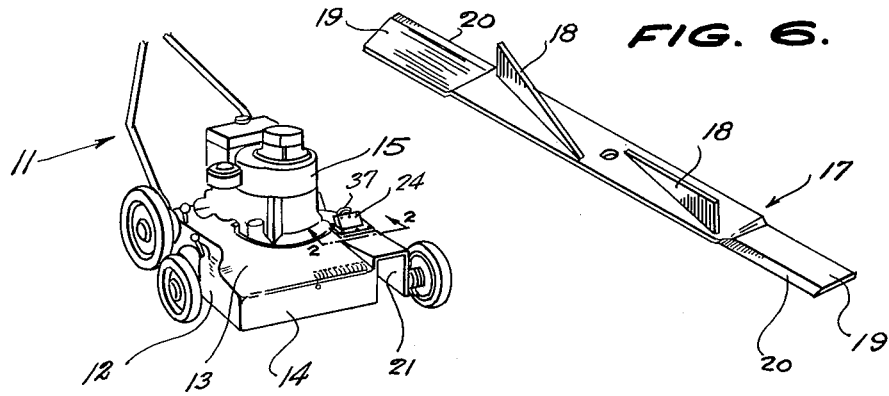
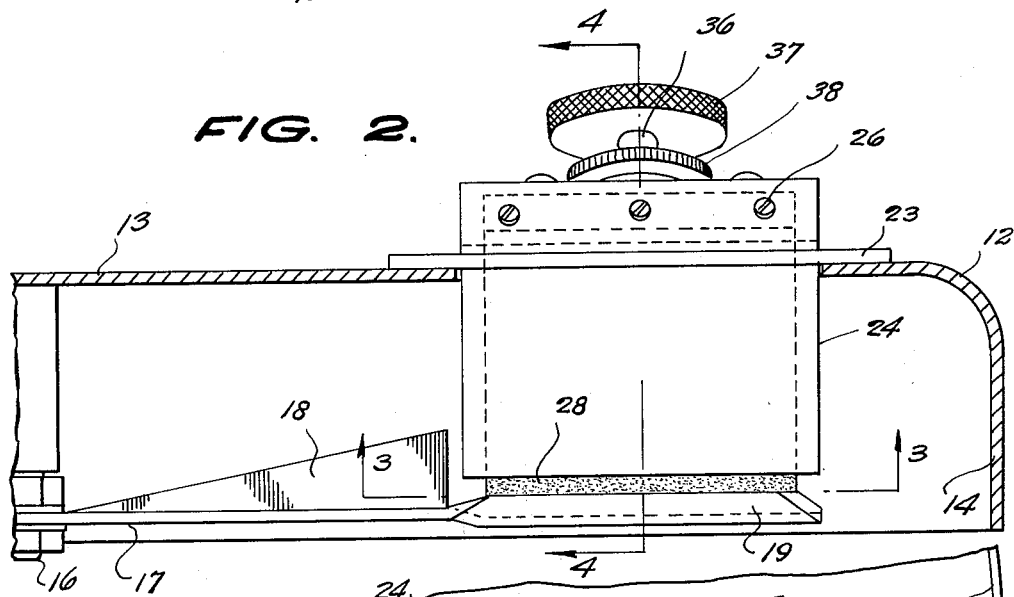
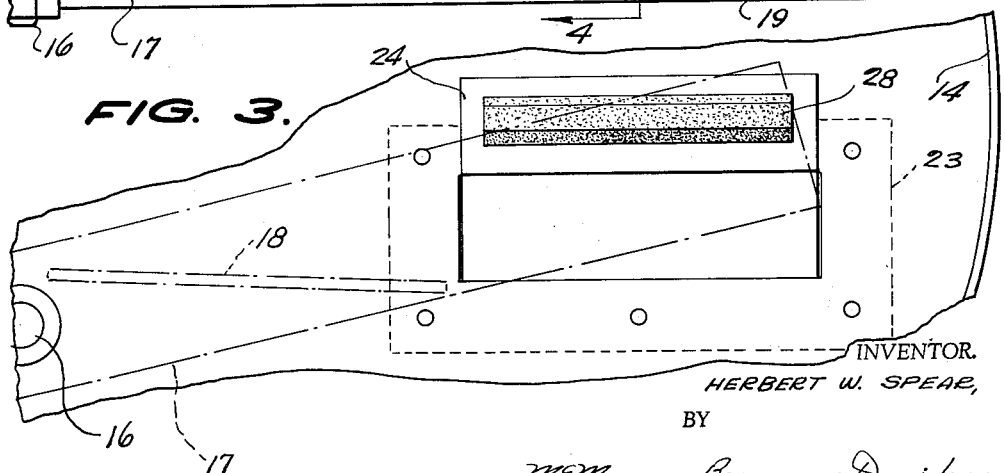
INVENTOR.
HERBERT W. SPEAR,
BY
McMorrow, Berman & Davidson
ATTORNEYS.

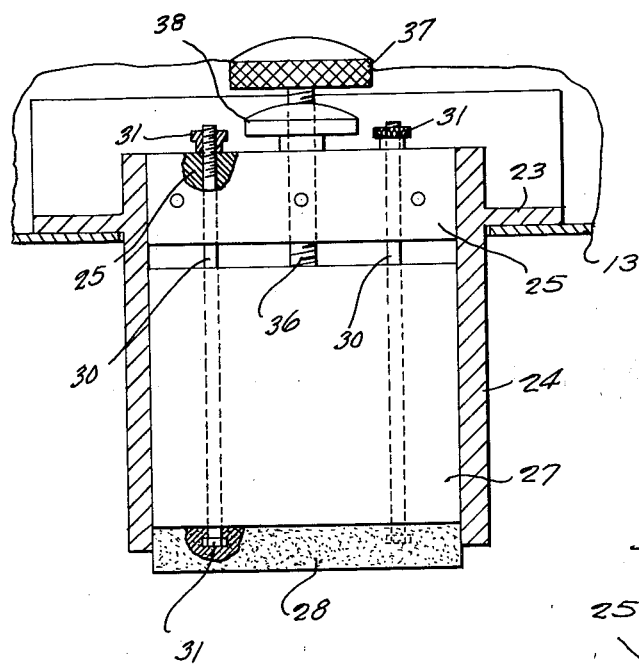
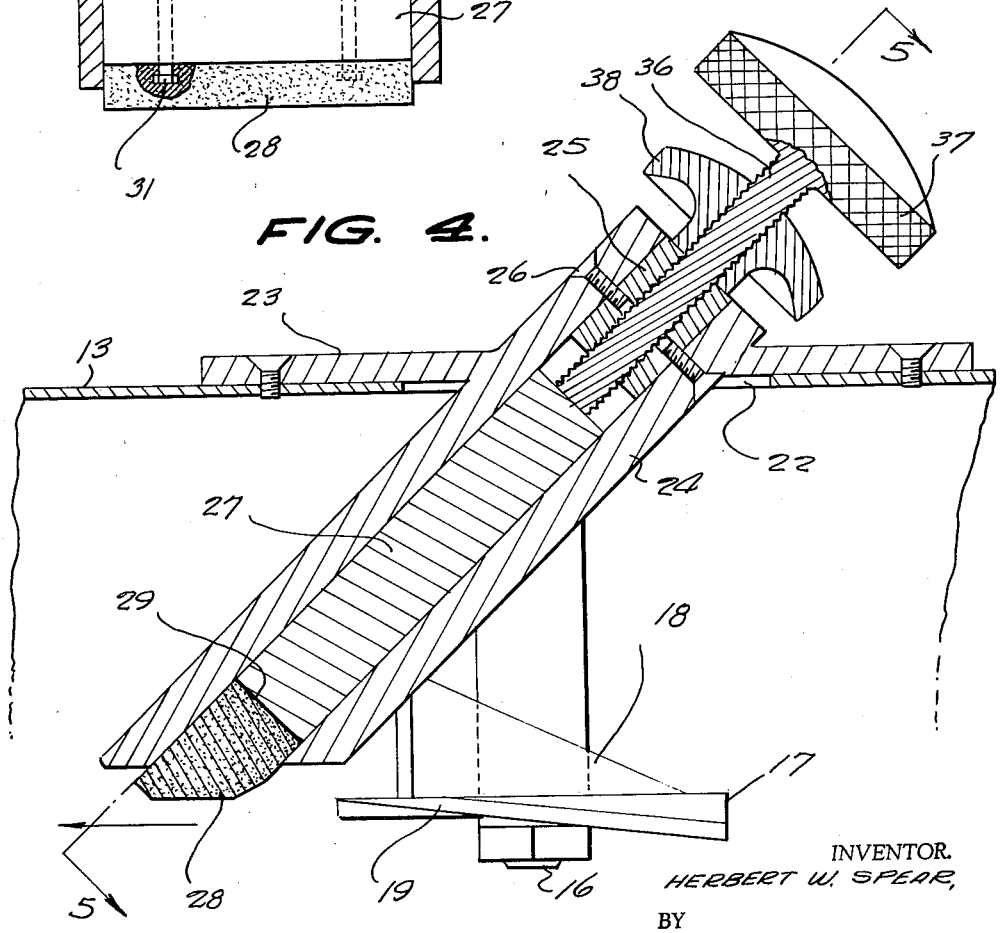

United States Patent Office 3,136,107
Patented June 9, 1964

3,136,107
LAWN MOWER SHARPENER
Herbert W. Spear, Oakhurst, Calif. (1491 Crestview Ave., San Bernardino, Calif.), assignor to Charles A. Crete, Marysville, Calif.
Filed Oct. 5, 1962, Ser. No. 229,516
3 Claims. (Cl. 56—25.4)

This invention relates to improvements in power lawn mowers and more particularly to a blade-sharpening attachment for a rotary power mower of the type having a substantially horizontal rotating blade.

A main object of the invention is to provide a novel and improved sharpening attachment for a rotary lawn mower, the attachment being simple in construction, being easy to install, and providing an efficient and convenient means for sharpening a lawn mower blade whenever necessary without the necessity of removing the blade.

A further object of the invention is to provide an improved blade-sharpening attachment for a rotary lawn mower of the type having a substantially horizontal rotating blade, the attachment involving relatively inexpensive components, being durable in construction, being easy to adjust, and greatly increasing the efficiency of the lawn mower with which it is employed by maintaining the rotating blade thereof in an efficient and serviceable condition.

Further objects and advantages of the invention will become apparent from the following description and claims, and from the accompanying drawings, wherein:

FIGURE 1 is a perspective view of a rotary lawn mower equipped with an improved blade-sharpening attachment constructed in accordance with the present invention.

FIGURE 2 is an enlarged vertical cross sectional view taken substantially on the line 2—2 of FIGURE 1.

FIGURE 3 is a horizontal cross sectional view taken substantially on the line 3—3 of FIGURE 2.

FIGURE 4 is a transverse vertical cross sectional view taken substantially on the line 4—4 of FIGURE 2.

FIGURE 5 is a cross sectional view, to a reduced scale, taken substantially on the line 5—5 of FIGURE 4.

FIGURE 6 is a perspective view of a typical rotary lawn mower blade similar to that employed in the lawn mower of FIGURES 1 to 5.

Referring to the drawings, 11 generally designates a power lawn mower of substantially standard construction, the lawn mower having a wheeled housing 12 provided with a plate-like top wall 13 and depending peripheral walls 14. Mounted on the top wall 13 is an internal combustion engine 15 having a vertical shaft 16 depending into the housing 12 substantially centrally thereof. Secured on the bottom end of the shaft 16 is a substantially horizontal rotating blade 17, said blade having secured thereon the opposing upstanding, generally triangular air vanes 18, 18, as shown in FIGURE 6, and being provided outwardly of the air vanes 18, 18 with the terminal cutter portions 19, 19 having the beveled cutting edges 20, 20.

It will be noted from FIGURE 6 that the terminal cutter portions 19 are inclined upwardly and forwardly in the direction of rotation of the blade 17.

The housing 12 is formed at one side thereof with the forwardly opening air discharge duct 21 through which grass clippings and other debris are exhausted with the air current produced by the rotating air vanes 18, 18 during the operation of the lawn mower.

The top wall 13 of the housing 12 is formed at any convenient location above the path of travel of the cutter elements 19 with an aperture 22, and secured on the top wall 13 over said aperture is a bracket plate 23. Rigidly secured to the bracket plate and depending therefrom through the aperture 22 into the housing 12 is an inclined, generally rectangular guide sleeve 24 which is inclined downwardly in the direction of rotation of the terminal cutter elements 19, as is clearly shown in FIGURE 4. The guide sleeve 24 is of horizontally elongated generally rectangular cross sectional shape, as is clearly apparent from FIGURE 3, and secured in the top end portion of the guide sleeve is a supporting block 25.

As shown in FIGURE 4, the block 25 may be rigidly secured in the top end portion of the sleeve 24 by means of fastening screws 26 engaged through the front and rear walls of the sleeve and threadedly engaged in the block 25.

Slidably engaged in the sleeve 24 below the stationary block 25 is a movable block 27 of substantial axial length in the sleeve 24, and rigidly secured to the bottom edge of the block 27 is a sharpening stone 28, the stone 28 being rigidly secured to the bottom end of the block 27 by suitable cement 29.

The sharpening stone 28 and block 27 are connected to the stationary upper block 25 by a pair of suspension bolts 30, 30, the bolts 30 having headed bottom end portions 31 which are embedded in the sharpening stone 28 and extending slidably through the stationary block 25, being provided at their top ends with thumb nuts 31. The thumb nuts 31, 31 may be adjusted so that downward adjustment of the block 27 and stone 28 will be limited by the engagement of the thumb nuts with the top surface of block 25 to a position wherein the stone 28 is engageable with the leading edges of the terminal cutter elements 19 to properly form the cutting bevels 20. As shown in FIGURE 4, the plane of the bottom end of sleeve 24 is substantially horizontal and the stone 28 may be extended below the plane of the bottom of sleeve 24 to the position illustrated in FIGURE 4 so that it is substantially in the path of movement of the leading edges of the terminal cutter elements 19. The plane of the bottom of sleeve 24 is sufficiently elevated above the plane of the rotating cutter elements 19 so that ample clearance is provided for the cutter elements. As previously mentioned, the thumb nuts 31 are adjustable to limit the extension of the stone 28 to the position wherein the stone provides the proper abrading action on the leading edges of the cutter elements 19 to form the desired cutting bevels 20.

The block 27 and cutting stone 28 are held in their operating positions, illustrated in FIGURE 4, by the provision of an adjustable abutment screw 36 disposed centrally between the tension bolts 30, 30 and threadedly engaged through the center portion of the stationary block 25, the bottom end of the screw 36 being engageable with the top edge of the block 27. The screw 36 is provided with an enlarged knurled head 37 for manually rotating same. Threadedly mounted on the screw 36 is a knurled locking nut 38 which may be tightened against the stationary block 25 to lock the screw 36 in adjusted position.

With the nut 38 loosened and backed off and with the screw 36 retracted, the stone 28 may be retracted upwardly so that its bottom surface is substantially flush with the bottom plane of the sleeve, this being accomplished by rotating the nuts 31 on the supporting bolts 30. With the stone 28 thus retracted, the stone and sleeve 27 may be locked in the retracted position by engaging the screw 36 against the top end of the block 27 and locking the screw in place by tightening the lock nut 38. When it is desired to sharpen the cutter elements 19 of the mower blade 17, the nut 38 is loosened and backed off, the nuts 31 are loosened so that the stone 28 is lowered substantially to the position thereof shown in FIGURE 4, namely, to the position wherein the bottom of the stone 28 is in the path of movement of the leading edges of the cutter elements 19, after which the stone is locked in its position by tightening the screw 36 and locking the screw in place by tightening the locking nut 38 against the top of stationary block 25.

With the parts adjusted to their working positions, namely, the positions thereof illustrated in FIGURE 4, the cutter elements 19 of the blade may be sharpened by running the lawn mower for a short period of time, for example, for a period of about thirty seconds. After the blade has been sharpened, the stone 28 may be retracted and locked in retracted position by the procedure above described.

It will be understood that the cutter elements 19 may be sharpened whenever required, for example, prior to each use of the lawn mower. The blade can easily be sharpened each time the lawn mower is used by following the procedure above outlined, namely, extending the sharpening stone 28 to the position of FIGURE 4, locking the stone in this position by means of screw 36 and lock nut 38, running the lawn mower for about thirty seconds, or a similar period of time, shutting off the lawn mower, retracting the stone 28, and locking the stone in its retracted position.

While a specific embodiment of an improved blade sharpening attachment for a rotary lawn mower has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a rotary lawn mower having a wheeled housing provided with a plate-like top wall and depending peripheral walls, a motor mounted on the top wall and having a vertical shaft depending into the housing, and a substantially horizontal rotating blade secured to said shaft in said housing, a guide sleeve rigidly secured to said top wall and depending a substantial distance downwardly into said housing adjacent the path of said blade, a sharpening element slidably mounted in and projecting below said sleeve, and threadedly adjustable means connected between the top portion of the guide sleeve and the sharpening element to adjustably secure said sharpening element in said sleeve so that said element engages the leading edge of the blade.

2. In a rotary lawn mower having a wheeled housing provided with a plate-like top wall and depending peripheral walls, a motor mounted on the top wall and having a vertical shaft depending into the housing, and a substantially horizontal rotating blade secured to said shaft in said housing, a guide sleeve rigidly secured to said top wall and depending a substantial distance downwardly into said housing adjacent the path of said blade, said sleeve being inclined downwardly in the direction of rotation of said blade, a sharpening element slidably mounted in and projecting below said sleeve, and threadedly adjustable means connected between the top portion of the guide sleeve and the sharpening element to adjustably secure said sharpening element in said sleeve so that said element engages the leading edge of the blade.

3. In a rotary lawn mower having a wheeled housing provided with a plate-like top wall and depending peripheral walls, a motor mounted on the top wall and having a vertical shaft depending into the housing, and a substantially horizontal rotating blade secured to said shaft in said housing, a guide sleeve rigidly secured to said top wall and depending a substantial distance downwardly into said housing adjacent the path of said blade, said sleeve being inclined downwardly in the direction of rotation of said blade, a support rigidly secured in the top portion of said sleeve, a block slidably mounted in the sleeve below the support, a sharpening stone secured to the bottom of said block and being movable to a position projecting below the sleeve, bolt means engaging through the support and block and being secured to the block, thereby suspending the block in the sleeve, abutment nut means threaded on said bolt means and engaging the top of said support to adjust the position of said sharpening stone so that the stone is engageable with the leading edge of the blade, and an abutment screw threadedly engaged through said support and being engageable with the top of said block to lock the stone in adjusted position.

References Cited in the file of this patent

UNITED STATES PATENTS

| | | |
|---|---|---|
| 1,044,137 | Cassady | Nov. 12, 1912 |
| 1,047,814 | Johansen | Dec. 17, 1912 |
| 2,826,032 | Hayes | Mar. 11, 1958 |